United States Patent

Singh et al.

[11] Patent Number: 6,045,841
[45] Date of Patent: Apr. 4, 2000

[54] METHOD OF PRE-COOKING SLICED BACON

[75] Inventors: Prem S. Singh, Glen Ellyn; Brian Demos, Rockport, both of Ill.; Woon S. Chan, Green Bay, Wis.

[73] Assignee: Swift-Eckrich, Inc., Downers Grove, Ill.

[21] Appl. No.: 09/131,721

[22] Filed: Aug. 10, 1998

[51] Int. Cl.⁷ .................................................. A23L 1/31
[52] U.S. Cl. ..................... 426/243; 426/645; 426/518; 426/523
[58] Field of Search ................... 426/241, 243, 426/332, 641, 645, 652, 518, 520, 523

[56] References Cited

U.S. PATENT DOCUMENTS

| | | | |
|---|---|---|---|
| 2,974,047 | 3/1961 | Holmes | 99/174 |
| 3,134,678 | 5/1964 | Wierbicki et al. | 99/159 |
| 3,878,307 | 4/1975 | Coleman et al. | 426/266 |
| 3,906,115 | 9/1975 | Jeppson | 426/243 |
| 3,961,568 | 6/1976 | Jeppson | 99/339 |
| 4,169,161 | 9/1979 | Leidy et al. | 426/89 |
| 4,379,794 | 4/1983 | Theiler | 426/266 |
| 4,411,922 | 10/1983 | Theiler | 426/266 |
| 4,414,232 | 11/1983 | Sleeth et al. | 426/266 |
| 4,435,433 | 3/1984 | Theiler | 426/266 |
| 4,532,858 | 8/1985 | Hershfeld | 99/534 |
| 4,917,911 | 4/1990 | Bush et al. | 426/243 |
| 4,940,590 | 7/1990 | Williams et al. | 426/92 |
| 4,957,756 | 9/1990 | Olander et al. | 426/243 |
| 5,090,939 | 2/1992 | Leblanc | 452/127 |
| 5,132,126 | 7/1992 | Sinkler et al. | 426/241 |
| 5,407,693 | 4/1995 | Brooks et al. | 426/523 |
| 5,513,558 | 5/1996 | Erickson et al. | 99/330 |
| 5,514,396 | 5/1996 | Mahboob | 426/243 |
| 5,520,944 | 5/1996 | Richardson et al. | 426/438 |
| 5,567,460 | 10/1996 | Afman | 426/264 |

FOREIGN PATENT DOCUMENTS

| | | |
|---|---|---|
| 0 666 030 A1 | 8/1995 | European Pat. Off. . |
| 0 683 986 A1 | 11/1995 | European Pat. Off. . |
| 79036 | 3/1998 | Ireland . |
| 848014 | 9/1960 | United Kingdom . |
| 944278 | 12/1963 | United Kingdom . |
| 1542080 | 3/1979 | United Kingdom . |
| WO 98/17121 | 4/1998 | WIPO . |

*Primary Examiner*—David Lacey
*Assistant Examiner*—Drew Becker
*Attorney, Agent, or Firm*—Pretty, Schroeder & Poplawski

[57] ABSTRACT

Disclosed is a method for precooking sliced bacon comprising the steps of partially cooking sliced bacon in a microwave oven. A organoleptic enhancing liquid is applied to the surfaces of bacon slices either during or after the cooking and the cooking is then completed by heating the partially cooked sliced bacon in a browning oven. Alternatively, the sliced bacon is first treated with the organoleptic enhancing liquid and partially cooked in the browning oven, then cooking is completed in the microwave oven.

22 Claims, No Drawings

METHOD OF PRE-COOKING SLICED BACON

BACKGROUND OF THE INVENTION

1. Field of the Invention

This invention relates to a method for preparing food products. In particular, it relates to a method for preparing precooked, sliced bacon and related products.

2. Discussion of Related Art

The term "bacon" broadly defines a category of cured and processed pork bellies, most commonly pork bellies that have been sliced into strips or round pieces. Curing traditionally entails the infusion of a liquid pickle solution into the pork bellies. Infusion of a pickle solution creates an infusion weight that exceeds initial or "green" weight of the pork belly. Depending on manufacturing capabilities and customer preference, infusion weight may be any where from 105% to 115% of green weight.

For a manufacturer to label its product as uncooked bacon, federal regulations require that the cured pork bellies must have a weight not exceeding the weight of the green pork belly. To obtain the necessary weight reduction, the prior art has subjected the infused pork bellies to a prolonged, low-temperature cook cycle in smoke house ovens. Modem techniques employ smoke house ovens which heat the product to a core temperature of 126° F. to 140° F. during a 6 to 12 hour cook cycle. This slow, low temperature heating produces a 10%–15% loss of injected weight without reaching temperatures to fully cook the pork bellies. After the smokehouse treatment, the internal temperatures of the cured pork bellies are chilled to below 35° F. to facilitate slicing. The product is sliced and then packaged.

Typically, the uncooked, sliced bacon is cooked using heat generated from the surface of a skillet or grill. The heat renders fat contained in the uncooked bacon causing the bacon to shrink while producing bacon grease. The intense heat at the surface of the bacon causes the bacon to crisp and brown and causes other reactions producing the color, texture, and flavor of bacon that is highly desirable to the consumer.

There are numerous drawbacks to this traditional manner of cooking, including the spattering of grease during cooking, the disposal of grease after cooking, and the relatively long time and focused effort required for cooking. The bacon drippings also pose a safety hazard, because of their potential to burn or to catch on fire. Consequently, there has been a need for precooked bacon that can be simply and quickly reheated in a microwave oven or on a hot surface.

Manufacturers of bacon have attempted to meet this need by precooking bacon in microwave ovens. For a manufacturer to label its product as "cooked" or "precooked," federal regulations require that the cured, cooked pork bellies must have a yield not more than 40% the weight of uncured pork bellies, i.e., not less than 60% shrinkage from the initial weight of the pork belly.

A generally unwanted byproduct of the cooking process is the bacon fat or drippings produced when the bacon is cooked at a temperature that renders the bacon fat. Because of environmental concerns, manufacturers cannot simply dispose of the bacon drippings. Instead, the bacon drippings must be treated in the manufacturing plant's waste treatment facility or processed using an on-site or remote rendering process. Consequently, there exists a need for a precooking process that minimizes or eliminates the amount of bacon drippings that need to be treated.

Cooking in microwave ovens is preferred by bacon manufacturers, because it provides a quick and inexpensive method for heating the meat and obtaining the requisite weight reduction. The energy required for microwave heating is only 60%–80% of the energy required by other sources. There are significant drawbacks to microwave cooking, however. In particular, bacon slices heated by microwave energy are heated from within to a maximum temperature of 212° F. as opposed to by the intense energy produced at the surface of the bacon slices when they are cooked on a skillet or grill. As a result, microwave processing results in a lack of surface browning, a lack of red lean color, and a lack of the texture and flavor development expected of traditionally cooked bacon. Consequently, there exists a further need for a precooking process that produces bacon having the color, texture, aroma, and flavor of traditionally cooked bacon.

Thus, there remains a definite need for an effective method for precooking bacon that minimizes or eliminates the amount of bacon drippings to be disposed. There remains a further definite need for a quick and inexpensive method for precooking bacon having the color, texture, aroma, and flavor of traditionally cooked bacon. The present invention satisfies these and other needs and provides further related advantages.

SUMMARY OF THE INVENTION

The present invention, which addresses the above needs is embodied in an efficient and low-cost method of producing precooked, sliced meat, such as precooked, sliced bacon and precooked, sliced turkey bacon, that can be simply reheated to produce meat slices having the same organoleptic properties as are produced when uncooked meat is cooked on a grill or skillet. The presently preferred starting material is pork bellies that have been cured, smoked, and cut into slices. In some embodiments, the sliced bacon starting material is initially, partially cooked by heating in a microwave oven until the weight of the sliced bacon is reduced, preferably by from about 80% to about 20%, more preferably by from about 70% to about 40%, and most preferably by from about 60% to about 50%.

An organoleptic enhancing liquid is then applied to the surfaces of bacon slices, such as by spraying, drenching or dipping. In some embodiments, the organoleptic enhancing liquid is applied in an amount sufficient to increase the weight of the partially cooked bacon slices by about 1% to about 20%, preferably from about 8% to about 15%, based on the weight of the partially cooked sliced bacon.

An advantage of the method in accordance with the invention is that bacon drippings or the fat or the non-fat phases obtained from bacon drippings collected during the initial, partial cooking can be used as the organoleptic enhancing liquid. In some embodiments, the organoleptic enhancing liquid includes other edible fats, colorants, flavorants or mixtures thereof.

The precooking is completed by heating, in some embodiments at a temperature of from about 300° F. to about 500° F., the partially cooked sliced bacon in a browning oven. Suitable browning ovens include impingement ovens, circulating convection air ovens, and infra-red ovens.

In preferred embodiments the browning oven is an impingement oven and, in some preferred embodiments, the impingement oven heats the partially cooked sliced bacon with impinging air having a vertical velocity of from about 1500 feet per minute to about 4000 feet per minute in both the upward and downward directions.

In other embodiments, the bacon slices are treated with the organoleptic enhancing liquid and initially, partially cooked in the browning oven. Cooking is then completed in the microwave oven. In both embodiments, the weight of the completely cooked sliced bacon is reduced by from about 80% to about 60%, preferably from about 75% to about 60%, based on the weight of the cured, uncooked, sliced bacon.

DETAILED DESCRIPTION OF THE PREFERRED EMBODIMENTS

Particular embodiments of the invention are described below in some detail for the purpose of illustrating its principles and operation. However, various modifications may be made, and the scope of the invention is not limited to the exemplary embodiments described below. Accordingly, while specific reference is made to cooking slices of meat obtained from pork bellies, it can be appreciated that aspects of the invention may be applied to the precooking of other sliced meats. For example, a method in accordance with the invention can be used to precook Canadian bacon, Wiltshire bacon, beef bacon, jowl bacon or any other type of bacon including bacon analogs such as co-extruded turkey bacon.

In the representative embodiments where the food product is pork bellies, the pork bellies are cured before slicing. Methods for curing pork bellies are well known in the art and are not, per se, part of the invention. Curing is accomplished by injecting salt, either alone or in combination with sodium or potassium nitrite, to the green pork belly and allowing it to disperse throughout the meat. Salt acts by dehydration and altering osmotic pressure to inhibit growth of spoilage bacteria. Nitrite retards development of rancidity and produces the characteristic cured meat flavor. It also reacts with the meat pigments to stabilize the characteristic color, and inhibits the growth of *Clostridium botulinum* and other spoilage microorganisms. Additional curing ingredients include polyphosphates, such as sodium tripolyphosphate to increase the water-binding capacity of the cured bacon, sodium erythrobate to stabilize the nitrite and to meet USDA regulations, colorants, and flavorants, such as sugar and spices. In preferred embodiments, the curing ingredients are incorporated into an aqueous brine or "pickle" solution.

The ranges of the ingredients in the pickle solution can be varied generally within the following ranges: water, from about 60% to about 80%; salt, from about 10% to about 25%; sugar, or brown sugar, from about 2% to about 20%; sodium erythrobate, from about 0.05 to about 0.4%; sodium nitrite, from about 0.01% to about 0.125%; and sodium tripolyphosphate, up to about 0.5%. The lower range on the water is about the minimum amount needed to dissolve the cure ingredients, while the maximum is selected to avoid unnecessary energy consumption during subsequent cooking.

The pickle solution is applied by any suitable method. In a preferred embodiment, the pickle solution is pumped, i.e., injected directly into the lean side of the green pork belly under pressure to increase the weight of the meat by about 8% to about 15% of its green weight. The pickle solution is injected using a needle injection machine, such as made by Townsend Engineering Co. of Des Moines, Iowa. The needles in the injection machine are distributed across the width of the machine, preferably within about ½" of each other, and uniformly deliver pickle solution under pressure in the belly tissues.

The pork belly is then held for a sufficient period of time for the pickle solution to disperse throughout the meat. Alternatively, the cure ingredients can be added as a dry rub to the pork belly or by immersing the pork belly in a cure solution.

After curing, the pork bellies are moved to a smokehouse. Smoking of a whole pork belly is carried out for development of smoky flavor, additional preservation, development of color, and protection from oxidation. Smoke is applied to the pork belly under low heat for a period sufficient to reduce the weight of the cured pork belly to within the limits imposed by federal regulations. While smoke has traditionally been generated by smoldering wood or sawdust, liquid smoke is now preferred, because it can be applied more uniformly. Liquid smoke is applied by spraying, dipping or atomizing with heat. Alternatively, the smoke is injected directly into the meat as an ingredient of the pickle solution, typically in an amount up to about 15%, based on the weight of the pickle solution, thus accelerating the dispersion of the chemicals contained in the smoke. Thus, the use of liquid smoke avoids the necessity of having to clean equipment and, also, avoids the health hazards of environmental pollution from smoke vapor.

Proper smokehouse temperatures for bacon do not render the bacon fat, yet are sufficiently high that moisture is drawn off rapidly. Generally, the temperature of a smokehouse for bacon is less than about 160° F. Typically, the internal temperature of the pork belly is heated to between about 126° F. to about 140° F. The higher temperatures enhance the development and fixing of the cured meat color. The smoking step is complete when the moisture content has been stabilized at a level to provide a smoked, cured, and chilled weight within the range required by federal regulations. This ordinarily requires minimum periods of time ranging from about 6 to about 8 hours, although smoking for longer periods of time is possible. A completely cured and smoke pork belly has a stable reddish color and is firm to the touch.

The resulting cured and smoked pork belly is then chilled to temperature below about 35° F., preferably between about 24° F. and about 28° F. Suitable apparatus for chilling the cured and smoked pork belly include nitrogen and carbon dioxide tunnels. One such tunnel is manufactured by Airco Cryogenics of Murray Hill N.J. This chilling step further inhibits undesirable bacterial growth, and provides proper stiffness for slicing. The pork bellies can be pressed or shaped into a uniform shape or size on a bacon press such as that made by Ross Industries of Midland, Virginia. Uniform size is desirable so that the bellies have the proper dimensions for slicing and packaging. It is also desirable from a standpoint of consumer appeal to have bacon slices of uniform size.

The chilled pork belly is then sliced, in preferred embodiments, using a high speed slicers onto a continuous conveyor belt that passes through a microwave cooking tunnel. The pork bellies are loaded vertically from the tip, and sliced such that individual slices are placed directly on to the continuous conveyor belt. The slices may be sliced to a thickness of between about 0.6 mm to about 6.4 mm, preferably from about 1.5 mm to about 4.2 mm.

The sliced bacon is then placed in a microwave oven, preferably in a continuous microwave cooking tunnel, for partial cooking. One particular continuous microwave oven found suitable for use in the present invention is manufactured by Amana Refrigeration Inc., Amana, Iowa, designated as Qmp 2103. The oven is powered by eight 70 kW generators which produce microwaves in the frequency of about 915 MHz.

The sliced bacon is cooked in the microwave oven until its weight is reduced by from about 80% to about 20%

(corresponding to cook yield of from about 20% to about 80%), preferably from about 70% to about 40% (corresponding to cook yield of from about 30% to about 60%), and most preferably from about 60% to about 50% (corresponding to cook yield of from about 40% to about 50%), based on the initial weight of the cured, uncooked sliced bacon.

Typically, the sliced bacon is heated with microwaves having a frequency of about 915 megacycles/sec for a period of about 1 to about 1½ minutes depending on microwave amperage, conveyor belt speed through the microwave oven and, the number of cooking cavities being employed. It should be understood that many conditions vary from one microwave oven to another, which makes uniform partial cooking possible by a combination of adjustments to power level, conveyor speed, and the amount of the product in the oven. In a preferred embodiment, the bacon drippings produced during microwave cooking are collected for use as an organoleptic enhancing liquid.

The organoleptic enhancing liquid is applied to the surfaces of the bacon slices during or after the partial microwave cooking. In some embodiments, the sliced bacon is treated with bacon drippings recovered during the partial microwave cooking. Alternatively, the organoleptic enhancing liquid can be bacon drippings obtained from a different source or combinations of the two. All of the bacon drippings can be used. Alternatively, the bacon drippings can be separated into components, such as a fat-phase component and a nonfat-phase component, and only certain of the components used. The fat and the non-fat phases are separated from one another using conventional techniques such a gravity separation or centrifugation.

In other embodiments, the sliced bacon is treated with some or all of the components of a pickle solution. And in some other embodiments the sliced bacon is treated with a combination of bacon drippings and pickle solution. The pickle solution can be the same as the solution originally used to cure the bacon or it can be different. It is also possible to use or include ingredients other than bacon drippings or some or all of the components of a pickle solution, such as other edible fats, meat proteins, flavorants, colorants, or mixtures thereof.

The organoleptic enhancing liquid is, preferably continuously, applied by spraying, drenching or dipping all the surfaces of the bacon slices, most preferably while the bacon slices are being partially cooked in the microwave oven. The amount applied is sufficient to uniformly cover the surfaces of the bacon slices. Typically, the organoleptic enhancing liquid will be applied in an amount sufficient to increase the weight of the partially cooked bacon slices by about 1% to about 20%, preferably by about 8% to about 15%, based on the weight of the sliced bacon after it has been partially cooked in the microwave oven.

After partial microwave cooking, the sliced bacon is continuously transported to a browning oven. Suitable browning ovens include impingement ovens, circulating convection air ovens, infra-red ovens or the like. Impinging air ovens are ovens that cause hot air to be impinged on the top and bottom of the bacon slices, thereby breaking the boundary layer surrounding the product's surface and are the preferred ovens. In the most preferred embodiments, the cooking is completed in an impingement oven with impinging air having a vertical velocity of from about 1500 feet per minute to about 4000 feet per minute in both the upward and downward directions.

The sliced bacon is then finally cooked in the browning oven until its weight is further reduced by about 80% to about 60% (corresponding to cook a yield of from about 20% to about 40%), based on the initial weight of the cured, uncooked sliced bacon starting material. Generally, the sliced bacon is cooked in the browning oven for a period of about 1 minute to about 5 minutes at a temperature of from about 300° F. to about 500° F., preferably at a temperature of about 400° F. The weight reduction caused by the combined heating in the microwave and browning ovens is from about 80% to about 60% (corresponding to a final cook yield of from about 20% to about 40%) based on the weight of the cured, uncooked bacon slices.

The completely cooked bacon is then chilled to about 40° F. and packaged in vacuum or in a modified atmosphere.

In other embodiments, the order of cooking is reversed. The bacon slices are treated with the organoleptic enhancing liquid and initially, partially cooked in the browning oven. Cooking is then completed in the microwave oven.

The following examples are included to further illustrate the invention. They are not limitations thereon.

EXAMPLE 1

Ten cured, smoked bacon slices weighing 146.6 grams were partially cooked in industrial microwave cooking tunnel manufactured by Amana Refrigeration Inc. The partial-cooking yield was 50%. Thus after the microwave partial cooking, the weight of the 10 slices was 73.30 grams.

The bacon drippings from the industrial microwave cooking were collected and the non-fat phase of the drippings was used for treating the partially cooked slices. The chemical analysis of this non-fat phase was as follows:

| Protein % | Fat % | Moisture % | Ash % | Carbohydrate % | Salt % | Dextrose % | Sucrose % | Fructose % | Sodium Nitrite ppm | pH |
|---|---|---|---|---|---|---|---|---|---|---|
| 5.7 | 0.4 | 82.7 | 9.3 | 1.9 | 6.92 | 0.12 | 1.64 | 0.00 | <0.5 | 5.87 |

To this organoleptic enhancing liquid was added 10%, by weight, of natural bacon flavor, 110° C. manufactured by Genarom International of New Brunswick, N.J. This combined organoleptic enhancing liquid was sprayed on all surfaces of bacon slices so that the slices were covered uniformly. After spraying the weight of the 10 slices was 85 grams. Thus the organoleptic enhancing liquid gain was 15.96% of the untreated weight.

The treated slices were then placed in a continuous impingement oven manufactured by Lincoln Food Service, Co. of Fort Wayne, Ind. The temperature in the oven was 395° F. The air velocity in the impingement oven was 2200 FPM. The time in impingement oven was 1.5 minutes. After cooking in the impingement oven for 1.5 minutes, the weight of the 10 cooked slices was 44.05 grams. The overall yield from the uncooked bacon slices was, therefore, 30.04%.

The slices had the excellent red lean bacon color and excellent aroma and texture and was much better visual appeal when compared to bacon slices that had been microwave cooked to the same 30% yield.

EXAMPLE 2

Ten cured, smoked bacon slices weighing 257.6 grams were partially cooked in industrial microwave cooking tunnel manufactured by Amana Refrigeration Inc. The partial-cooking yield was 50%. Thus after the microwave partial cooking, the weight of the 10 slices was 128.8 grams.

The fat phase obtained from the bacon drippings collected during the work described in Example 1 was used to treat the partially cooked slices. The fat phase was sprayed on all surfaces of bacon slices so that the slices were covered uniformly. After spraying the weight of the 10 slices was 143.8 grams. Thus, the organoleptic enhancing liquid gain was 11.60% of the un-treated weight.

The treated slices were placed on a transport belt and transported through an impingement oven made by Lincoln Food Service, Co. of Fort Wayne, Ind. The treated slices were cooked using 400° F. impinged air directed from both the top and the bottom of the belt. The velocity of air was 2200 FPM. The slices were cooked for 2 minutes. After cooking in the impingement oven, the weight of the ten slices was 81.25 g. Therefore, the shrink of the bacon slices was 43.5%, by weight, the yield of the impingement cooking was 56.5 and the combined yield then was 31.54% by weight.

The resulting precooked bacon slices have a desirable red lean meat color, excellent bacon flavor, and the crispy texture characteristic of bacon cooked in a skillet. This contrasted with the pale red color and poor texture bacon slices cooked in a microwave oven to the same yield.

While the invention has been described in detail with reference to certain preferred embodiments thereof, it will be understood that modifications and variations are within the spirit and scope of that which is described and claimed.

We claim:

1. A method for precooking sliced bacon comprising the steps of:
    partially cooking sliced bacon starting material by heating in a microwave oven;
    applying an organoleptic enhancing liquid to the surfaces of the sliced bacon starting material either during or after the cooking in the microwave oven; and
    completing the cooking by heating the partially cooked sliced bacon in a browning oven, to produce precooked sliced bacon having a crisp texture.

2. The method in accordance with claim 1 further comprising curing the bacon starting material before the partial cooking in the microwave oven.

3. The method in accordance with claim 2 further comprising smoking the bacon starting material before the partial cooking in the microwave oven.

4. The method in accordance with claim 2 wherein the weight of the sliced bacon is reduced by from about 80% to about 20%, based on the weight of the sliced bacon starting material by the partial cooking.

5. The method in accordance with claim 2 wherein the weight of the sliced bacon is reduced by from about 70% to about 40%, based on the weight of the sliced bacon starting material by the partial cooking.

6. The method in accordance with claim 2 wherein the weight of the sliced bacon is reduced by from about 60% to about 50%, based on the weight of the sliced bacon starting material by the partial cooking.

7. The method in accordance with claim 2 wherein the organoleptic enhancing liquid is applied to the surfaces of the sliced bacon starting material by spraying, drenching or dipping.

8. The method in accordance with claim 2 wherein the organoleptic enhancing liquid is applied in amount sufficient to increase the weight of the partially cooked sliced bacon by about 1% to about 20%, based on the weight of the sliced bacon after it has been partially cooked in the microwave oven.

9. The method in accordance with claim 2 wherein the organoleptic enhancing liquid is bacon drippings.

10. The method in accordance with claim 2 wherein the organoleptic enhancing liquid is a non-fat phase obtained from bacon drippings.

11. The method in accordance with claim 2 wherein the organoleptic enhancing liquid is a fat phase obtained from bacon drippings.

12. The method in accordance with claim 10 wherein the organoleptic enhancing liquid contains at least one added fat, meat protein, colorant, flavorant or mixture thereof.

13. The method in accordance with claim 11 wherein the organoleptic enhancing liquid contains at least one added fat, meat protein, colorant, flavorant or mixture thereof.

14. The method in accordance with claim 2 wherein the cooking is completed at a temperature of from about 300° F. to about 500° F.

15. The method in accordance with claim 2 wherein the browning oven is an impingement oven, a circulating convection air oven or an infra-red oven.

16. The method in accordance with claim 15 wherein the browning oven is an impingement oven.

17. The method in accordance with claim 16 wherein the impingement oven heats the partially cooked sliced bacon with impinging air having a vertical velocity of from about 1500 feet per minute to about 4000 feet per minute in both the upward and downward directions.

18. The method in accordance with claim 2 wherein the weight of the completely cooked sliced bacon is reduced by from about 80% to about 60%, based on the weight of the sliced bacon starting material.

19. A method for precooking sliced bacon comprising the steps of:
    curing bacon starting material;
    smoking the cured bacon;
    slicing the cured and smoked bacon;
    partially cooking the sliced bacon in a microwave oven to reduce its weight by from about 80% to about 20%, based on the weight of the bacon starting material;
    treating the surfaces of the sliced bacon either during or after the cooking in the microwave oven with sufficient organoleptic enhancing liquid to increase the weight of the partially cooked sliced bacon by about 1% to about 20% based on the weight of the sliced bacon after it has been partially cooked in the microwave oven; and
    completing the cooking by heating the partially cooked sliced bacon in an impingement oven with impinging air having a vertical velocity of from about 1500 feet per minute to about 4000 feet per minute in both the upward and downward directions at a temperature of from about 300° F. to about 500° F., until the weight of the completely cooked sliced bacon is reduced by from about 80% to about 60%, based on the weight of the bacon starting material and the completely cooked sliced bacon has a crisp texture.

20. The method in accordance with claim 19 wherein the organoleptic enhancing liquid is bacon drippings.

21. The method in accordance with claim 19 wherein the organoleptic enhancing liquid is a non-fat phase obtained from bacon drippings.

22. The method in accordance with claim 19 wherein the organoleptic enhancing liquid is a fat phase obtained from bacon drippings.

* * * * *